(12) United States Patent
Michaelos et al.

(10) Patent No.: US 7,883,017 B1
(45) Date of Patent: Feb. 8, 2011

(54) BANK CARD/OPTICAL MAGNIFIER SYSTEM

(76) Inventors: Louis J. Michaelos, 152 Coe Rd., Belleair, FL (US) 33756; John L. Michaelos, 324 Harbor View La., Belleair, FL (US) 33770

( * ) Notice: Subject to any disclaimer, the term of this patent is extended or adjusted under 35 U.S.C. 154(b) by 0 days.

(21) Appl. No.: 12/589,920

(22) Filed: Oct. 30, 2009

(51) Int. Cl.
*G06K 21/00* (2006.01)
(52) U.S. Cl. ...................................... 235/489; 235/487
(58) Field of Classification Search ................ 235/489, 235/487, 492, 454, 494
See application file for complete search history.

(56) References Cited

U.S. PATENT DOCUMENTS

| | | | |
|---|---|---|---|
| 5,215,334 A | 6/1993 | Presson | |
| 5,297,132 A * | 3/1994 | Takano et al. | 369/284 |
| 5,412,199 A | 5/1995 | Finkelstein | |
| 5,650,916 A * | 7/1997 | Osaki et al. | 361/737 |
| 6,794,671 B2 * | 9/2004 | Nicoli et al. | 250/574 |

FOREIGN PATENT DOCUMENTS

| | | | |
|---|---|---|---|
| FR | 2897698 A3 * | 8/2007 | |
| JP | 2000066074 A * | 3/2000 | |

* cited by examiner

*Primary Examiner*—Daniel St. Cyr

(57) ABSTRACT

A card in a rectangular configuration has horizontal upper and lower edges, vertical left and right side edges, front and rear faces, and horizontal and vertical mid lines. Indicia on the front face of the card is in the form of alphanumeric characters. A plurality of pinholes extend through the card. Each pinhole is adapted to refract light and magnify images to be read.

8 Claims, 3 Drawing Sheets

BANK CARD/OPTICAL MAGNIFIER SYSTEM

BACKGROUND OF THE INVENTION

1. Field of the Invention

The present invention relates to a bank card/optical magnifier system and more particularly pertains to facilitating a financial transaction by an owner of a bank card and for magnifying alphanumeric characters to be read in a safe, convenient, discreet and economical manner.

2. Description of the Prior Art

The use of magnifying systems of known designs and configurations is known in the prior art. More specifically, magnifying systems of known designs and configurations previously devised and utilized for the purpose of providing magnification of alphanumeric characters are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,215,334 issued Jun. 1, 1993 to Presson relates to an Emergency Medical Card. Also, U.S. Pat. No. 5,412,199 issued May 2, 1995 to Finkelstein relates to a Credit Card with Magnifying Lens. While these devices fulfill their respective, particular objectives and requirements, the aforementioned patents do not describe a bank card/optical magnifier system that allows facilitating a financial transaction by an owner of a bank card and for magnifying alphanumeric characters to be read in a safe, convenient, discreet and economical manner.

In this respect, the bank card/optical magnifier system according to the present invention substantially departs from the conventional concepts and designs of the prior art, and in doing so provides an apparatus primarily developed for the purpose of facilitating a financial transaction by an owner of a bank card and for magnifying alphanumeric characters to be read in a safe, convenient, discreet and economical manner.

Therefore, it can be appreciated that there exists a continuing need for a new and improved bank card/optical magnifier system which can be used for facilitating a financial transaction by an owner of a bank card and for magnifying alphanumeric characters to be read in a safe, convenient, discreet and economical manner. In this regard, the present invention substantially fulfills this need.

SUMMARY OF THE INVENTION

In view of the foregoing disadvantages inherent in the known types of magnifying systems of known designs and configurations now present in the prior art, the present invention provides an improved bank card/optical magnifier system. As such, the general purpose of the present invention, which will be described subsequently in greater detail, is to provide a new and improved bank card/optical magnifier system and method which has all the advantages of the prior art and none of the disadvantages.

To attain this, the present invention essentially comprises a bank card/optical magnifier system comprised of a plurality of components. Such components in their broadest context include a card, indicia, and a plurality of pinholes through the card. Such components are individually configured and correlated with respect to each other so as to attain the desired objective.

The bank card/optical magnifier system 10 of the present invention is for facilitating a financial transaction by an owner of a bank card and for magnifying alpha-numeric characters to be read. The facilitating and magnifying is done in a safe, convenient, discreet and economical manner.

First provided is a bank card in a rectangular configuration with a horizontal upper edge and a parallel lower edge spaced by a height. The card has a vertical left side edge and a parallel right side edge spaced by a width. The card has a front face and a rear face. The card has a horizontal mid line midway between the upper and lower edges. The card has a vertical mid line midway between the left and right side edges. The card is fabricated of a generally rigid plastic material.

Next provided is indicia on the front face of the card in the form of a multi-digit number, an expiration date and an owner's name. The multi-digit number is located beneath the horizontal mid-line and extending across the vertical mid line. The expiration date and the owner's name are located beneath the multi-digit number. The indicia is displayed as raised alphanumeric characters.

A magnetic strip is next provided on the rear face of the card. The magnetic strip is located beneath the horizontal mid line parallel with the lower edge. The magnetic strip contains digital data pertinent to the owner of the card.

Next provided is a transparent lens extending through the card above the horizontal mid line and between the vertical mid line and the right side edge. The transparent lens is adapted to refract light and magnify images to be read. The transparent lens has an optical power of between 0.25 and 10 diopters and a magnification capability of between 200 percent and 900 percent.

Lastly, a plurality of pinholes are provided. The pinholes extend through the card above the horizontal mid line and between the vertical mid line and the left side edge. Each pinhole is adapted to refract light and magnify images to be read. The plurality of pinholes include a center pinhole and a plurality of pinholes in an interior concentric ring and an exterior concentric ring. The pinholes are 1.2 millimeters in diameter plus or minus 10 percent, the internal concentric ring having a diameter of 0.5 inches plus or minus 10 percent, the external concentric ring having a diameter of 1.0 inch plus or minus 10 percent.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bank card/optical magnifier system which has all of the advantages of the prior art magnifying systems of known designs and configurations and none of the disadvantages.

It is another object of the present invention to provide a new and improved bank card/optical magnifier system which may be easily and efficiently manufactured and marketed.

It is further object of the present invention to provide a new and improved bank card/optical magnifier system which is of durable and reliable constructions.

An even further object of the present invention is to provide a new and improved bank card/optical magnifier system which is susceptible of a low cost of manufacture with regard to both materials and labor, and which accordingly is then susceptible of low prices of sale to the consuming public, thereby making such bank card/optical magnifier system economically available to the buying public.

Even still another object of the present invention is to provide a bank card/optical magnifier system for facilitating a financial transaction by an owner of a bank card and for magnifying alphanumeric characters to be read in a safe, convenient, discreet and economical manner.

Lastly, it is an object of the present invention to provide a new and improved card in a rectangular configuration with horizontal upper and lower edges, vertical left and right side edges, front and rear faces, and horizontal and vertical mid lines. Indicia on the front face of the card is in the form of alphanumeric characters. A plurality of pinholes extend through the card. Each pinhole is adapted to refract light and magnify images to be read.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
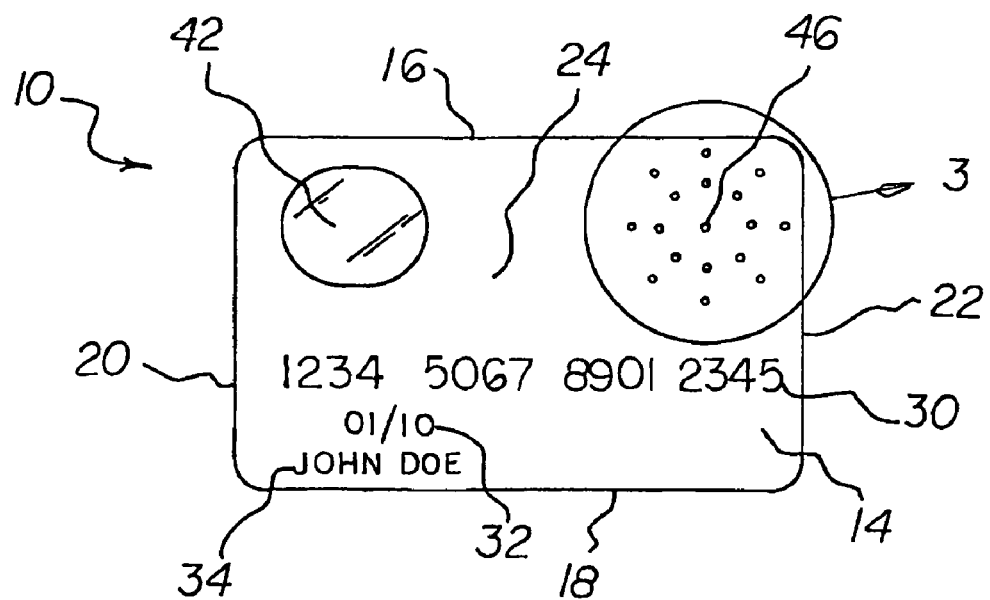
FIG. 1 is a front elevational view of a credit card/optical magnifier system constructed in accordance with the principles of the present invention.
Figure 2:
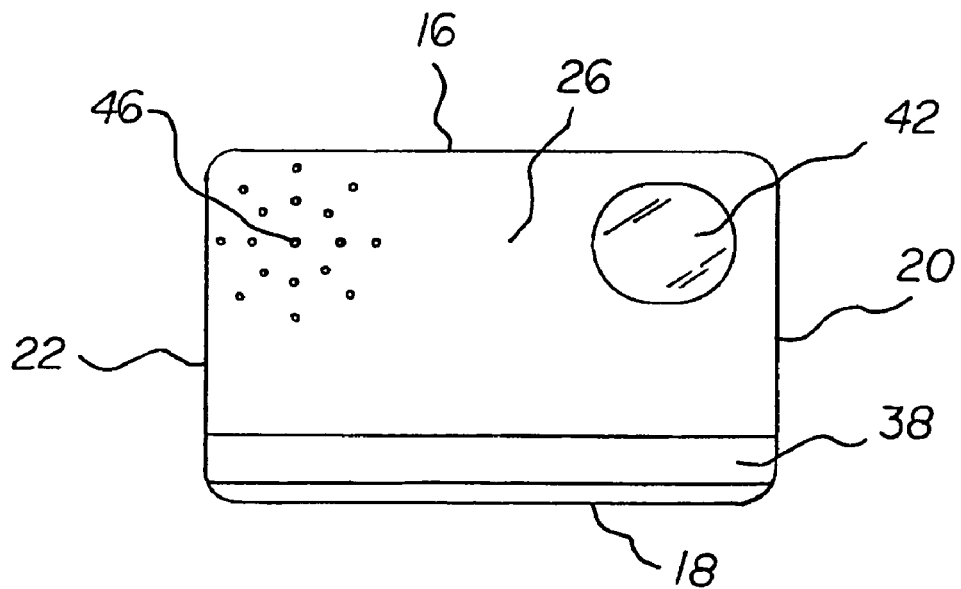
FIG. 2 is a rear elevational view of the system shown in FIG. 1.
Figure 3:
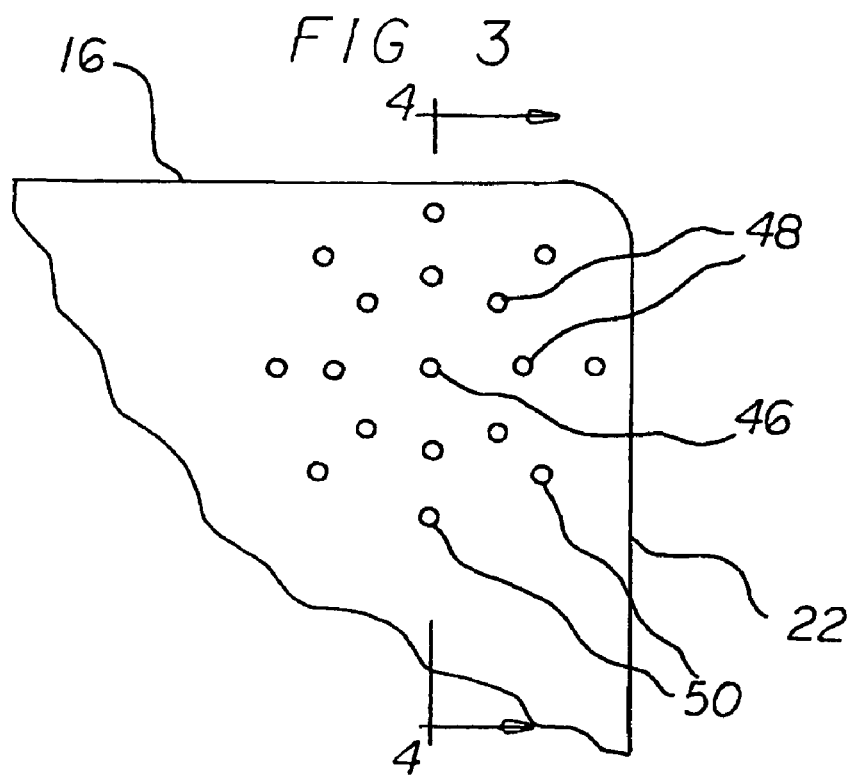
FIG. 3 is an enlarged showing of the portion of the system taken at Circle 3 of FIG. 1.
Figure 4:
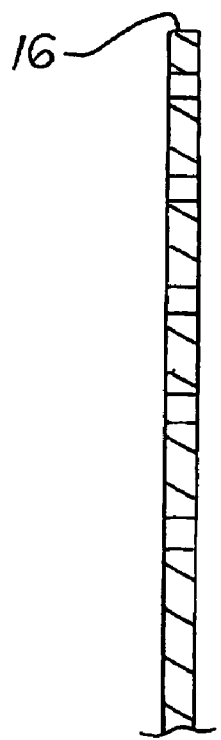
FIG. 4 is a cross sectional view taken along line 4-4 of FIG. 3.
Figure 5:
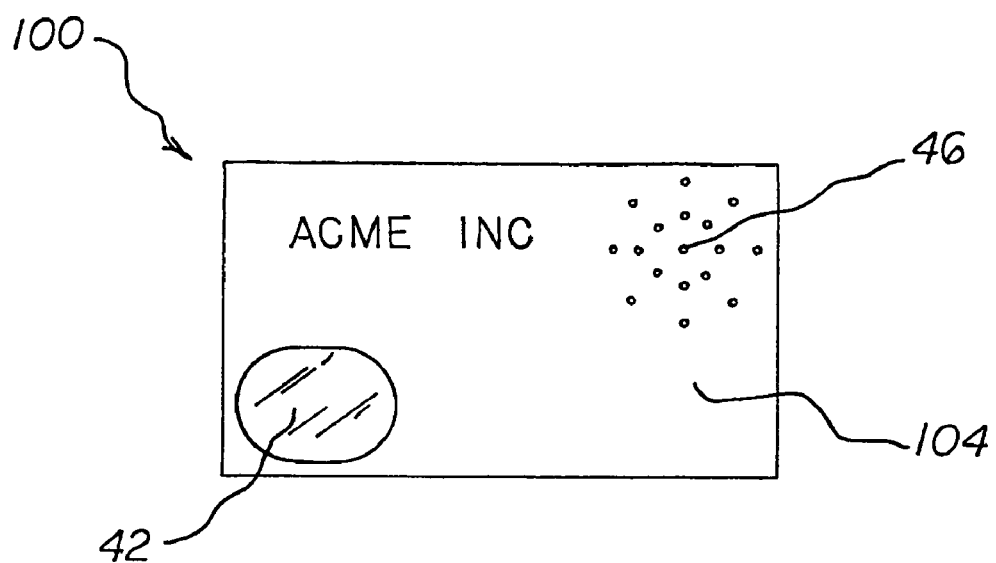
FIG. 5 is a front elevational view of a card/optical magnifier system constructed in accordance with an alternate embodiment of the invention.
Figure 6:
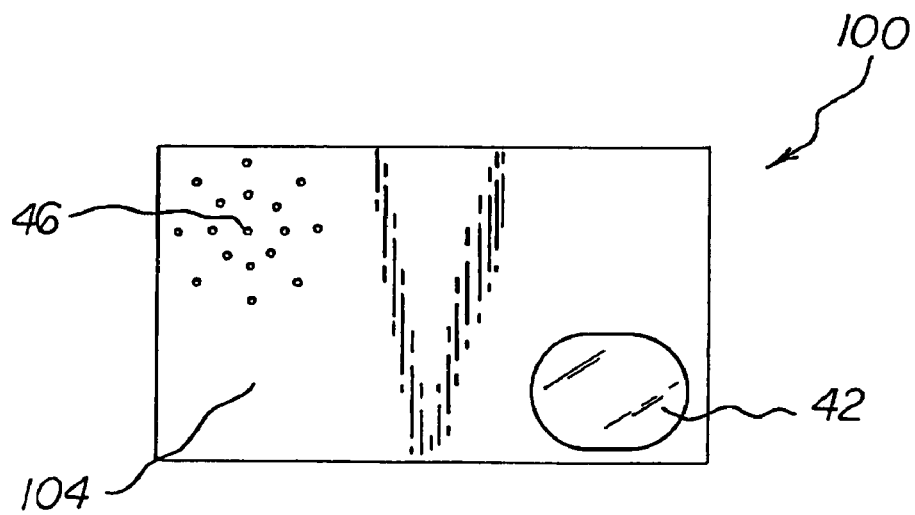
FIG. 6 is a rear elevational view of the system shown in FIG. 5.

With reference now to the drawings, and in particular to FIG. 1 thereof, the preferred embodiment of the new and improved bank card/optical magnifier system embodying the principles and concepts of the present invention and generally designated by the reference numeral 10 will be described.

The present invention, the bank card/optical magnifier system 10 is comprised of a plurality of components. Such components in their broadest context include a card, indicia, and a plurality of pinholes through the card. Such components are individually configured and correlated with respect to each other so as to attain the desired objective.

The bank card/optical magnifier system 10 of the present invention is for facilitating a financial transaction by an owner of a bank card and for magnifying alpha-numeric characters to be read. The facilitating and magnifying is done in a safe, convenient, discreet and economical manner.

First provided is a bank card 14 in a rectangular configuration with a horizontal upper edge 16 and a parallel lower edge 18 spaced by a height of between 2 and 2.5 inches. The card has a vertical left side edge 20 and a parallel right side edge 22 spaced by a width of between 3 and 3.5 inches. The card has a front face 24 and a rear face 26. The card has a horizontal mid line midway between the upper and lower edges. The card has a vertical mid line midway between the left and right side edges. The card is fabricated of a generally rigid plastic material and has a thickness of 0.030 inches, plus or minus 10 percent.

Next provided is indicia on the front face of the card in the form of a multi-digit number 30, an expiration date 32 and an owner's name 34. The multi-digit number is located beneath the horizontal mid-line and extending across the vertical mid line. The expiration date and the owner's name are located beneath the multi-digit number. The indicia is displayed as raised alphanumeric characters.

A magnetic strip 38 is next provided on the rear face of the card. The magnetic strip is located beneath the horizontal mid line parallel with the lower edge. The magnetic strip contains digital data pertinent to the owner of the card.

Next provided is a transparent lens 42 extending through the card above the horizontal mid line and between the vertical mid line and the right side edge. The transparent lens is adapted to refract light and magnify images to be read. The transparent lens has an optical power of between 0.25 and 10 diopters. The transparent lens has a magnification capability of between 200 percent and 900 percent.

Lastly, a plurality of pinholes are provided. The pinholes extend through the card above the horizontal mid line and between the vertical mid line and the left side edge. Each pinhole is adapted to refract light and magnify images to be read. The plurality of pinholes include a center pinhole 46 and a plurality of pinholes in an interior concentric ring 48 and an exterior concentric ring 50. The pinholes are 1.2 millimeters in diameter plus or minus 10 percent. The internal concentric ring has a diameter of 0.5 inches plus or minus 10 percent. The external concentric ring has a diameter of 1.0 inch plus or minus 10 percent. The plurality of pinholes in the pattern as described herein helps the user align his or her eye with the alphanumeric character being read with one of the pin holes in the line of sight.

An alternate embodiment of the invention is a system 100 which uses a business card 104. The business card is fabricated of a paper based material and has a thickness of 0.010 inches, plus or minus 10 percent.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A card system comprising:
   a card in a rectangular configuration having horizontal upper and lower edges, the card having vertical left and right side edges, the card having front and rear faces and horizontal and vertical mid lines;
   indicia on the front face of the card in the form of alpha-numeric characters; and
   a plurality of pinholes extending entirely through the card, each pinhole adapted to refract light and magnify images to be read, the plurality of pinholes including a center pinhole and a plurality of pinholes in a concentric ring the pinholes being 1.2 millimeters in diameter plus or minus 10 percent.

2. The system as set forth in claim 1 and further including a transparent lens extending through the card adapted to refract light and magnify images to be read.

3. The system as set forth in claim 2 wherein the transparent lens has an optical power of between 0.25 and 10 diopters.

4. The system as set forth in claim 2 wherein the transparent lens has a magnification capability of between 200 percent and 900 percent.

5. The system as set forth in claim 1 wherein the card is a card fabricated of a generally rigid plastic material and having a thickness of 0.030 inches, plus or minus 10 percent.

6. The system as set forth in claim 1 wherein the card is a business card fabricated of a paper based material and having a thickness of 0.010 inches, plus or minus 10 percent.

7. A card in a rectangular configuration having horizontal upper and lower edges, the card having vertical left and right side edges, the card having front and rear faces and horizontal and vertical mid lines;
   indicia on the front face of the card in the form of alpha-numeric characters; and
   a plurality of pinholes extending through the card, each pinhole adapted to refract light and magnify images to be read, the plurality of pinholes including a center pinhole and a plurality of pinholes in an internal concentric ring and an exterior concentric ring, the pinholes being 1.2 millimeters in diameter plus or minus 10 percent, the internal concentric ring having a diameter of 0.5 inches plus or minus 10 percent, the external concentric ring having a diameter of 1.0 inch plus or minus 10 percent.

8. A bank card/optical magnifier system for facilitating a financial transaction by an owner of a bank card and for magnifying alpha-numeric characters to be read, the system comprising, in combination:
   a bank card in a rectangular configuration with a horizontal upper edge and a parallel lower edge spaced by a height of between 2 and 2.5 inches, the bank card having a vertical left side edge and a parallel right side edge spaced by a width of between 3 and 3.5 inches, the card having a front face and a rear face, the bank card having a horizontal mid line midway between the upper and lower edges, the bank card having a vertical mid line midway between the left and right side edges, the bank card being fabricated of a generally rigid plastic material and having a thickness of 0.030 inches, plus or minus 10 percent;
   indicia on the front face of the bank card in the form of a multi-digit number, an expiration date and an owner's name, the multi-digit number being located beneath the horizontal mid-line and extending across the vertical mid line, the expiration date and the owner's name being located beneath the multi-digit number, the indicia being displayed as raised alphanumeric characters;
   a magnetic strip on the rear face of the bank card, the magnetic strip being located beneath the horizontal mid line parallel with the lower edge, the magnetic strip containing digital data pertinent to the owner of the bank card;
   a transparent lens extending through the bank card above the horizontal mid line and between the vertical mid line and the right side edge, the transparent lens adapted to refract light and magnify images to be read, the transparent lens having an optical power of between 0.25 and 10 diopters and a magnification capability of between 200 percent and 900 percent; and
   a plurality of pinholes extending through the bank card above the horizontal mid line and between the vertical mid line and the left side edge, each pinhole adapted to refract light and magnify images to be read, the plurality of pinholes including a center pinhole and a plurality of pinholes in an interior concentric ring and an exterior concentric ring, the pinholes being 1.2 millimeters in diameter plus or minus 10 percent, the internal concentric ring having a diameter of 0.5 inches plus or minus 10 percent, the external concentric ring having a diameter of 1.0 inch plus or minus 10 percent.

* * * * *